(12) United States Patent
Sime et al.

(10) Patent No.: US 8,565,970 B2
(45) Date of Patent: Oct. 22, 2013

(54) METHOD FOR CONTROLLING POWERTRAIN PUMPS

(75) Inventors: Karl Andrew Sime, Mason, MI (US); Brian L. Spohn, Holly, MI (US); Besim Demirovic, Troy, MI (US); Ryan D. Martini, Wolverine Lake, MI (US); Jean Marie Miller, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 13/211,775

(22) Filed: Aug. 17, 2011

(65) Prior Publication Data

US 2013/0046425 A1 Feb. 21, 2013

(51) Int. Cl.
*G06F 9/00* (2006.01)
(52) U.S. Cl.
USPC .................. 701/36; 701/22; 477/98
(58) Field of Classification Search
USPC ......... 701/22, 36, 51, 53; 180/350, 306, 65.1, 180/65.265, 65.275; 477/98, 156, 157, 158
See application file for complete search history.

(56) References Cited

U.S. PATENT DOCUMENTS

| 5,973,460 | A   | * | 10/1999 | Taga et al. ..................... 318/139 |
|-----------|-----|---|---------|-------------------------------------------|
| 2008/0131290 | A1 | * | 6/2008 | Magoon et al. .................. 417/38 |
| 2009/0143922 | A1 | * | 6/2009 | Juricak et al. ..................... 701/1 |
| 2009/0192685 | A1 | * | 7/2009 | Sime ............................... 701/60 |
| 2009/0320461 | A1 | * | 12/2009 | Morinaga et al. ............... 60/431 |
| 2010/0130327 | A1 | * | 5/2010 | Morgan, Jr. ....................... 477/5 |
| 2010/0137102 | A1 | * | 6/2010 | Sopko et al. .................... 477/118 |
| 2011/0106358 | A1 | * | 5/2011 | Sawada et al. ................... 701/22 |
| 2012/0290158 | A1 | * | 11/2012 | Yoshikawa ...................... 701/22 |

* cited by examiner

*Primary Examiner* — Darnell Jayne
*Assistant Examiner* — Sasha T Varghese
(74) *Attorney, Agent, or Firm* — Quinn Law Group, PLLC

(57) ABSTRACT

A method of controlling a pump supplying a fluid to a transmission includes sensing a requested power and an excess power for a powertrain. The requested power substantially meets the needs of the powertrain, while the excess power is not part of the requested power. The method includes sensing a triggering condition in response to the ability to convert the excess power into heat in the transmission, and determining that an operating temperature of the transmission is below a maximum. The method also includes determining a calibrated baseline and a dissipation command for the pump. The calibrated baseline command is configured to supply the fluid based upon the requested power, and the dissipation command is configured to supply additional fluid and consume the excess power with the pump. The method operates the pump at a combined command, which is equal to the calibrated baseline command plus the dissipation command.

14 Claims, 4 Drawing Sheets

METHOD FOR CONTROLLING POWERTRAIN PUMPS

STATEMENT REGARDING FEDERALLY SPONSORED RESEARCH OR DEVELOPMENT

This invention was made with U.S. Government support under an Agreement/Project number: DE-FC26-08NT04386, awarded by the Department of Energy. The U.S. Government may have certain rights in this invention.

TECHNICAL FIELD

This disclosure relates to operation and control of components within hybrid and alternative energy powertrains.

BACKGROUND

Motorized vehicles include a powertrain operable to propel the vehicle and power the onboard vehicle electronics. The powertrain, or drivetrain, generally includes an engine that powers the final drive system through a multi-speed transmission. Many vehicles are powered by a reciprocating-piston type internal combustion engine (ICE). The transmission may be supplied with transmission fluid or transmission oil to lubricate the components therein.

Hybrid vehicles utilize multiple, alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines (motor/generators) that operate individually or in concert with the internal combustion engine to propel the vehicle. An electric vehicle (EV) also includes one or more electric machines and energy storage devices used to propel the vehicle.

The electric machines convert kinetic energy into electric energy, which may be stored in an energy storage device. The electric energy from the energy storage device may then be converted back into kinetic energy for propulsion of the vehicle, or may be used to power electronics, auxiliary devices, or other components.

SUMMARY

A method of controlling a pump supplying a fluid to a transmission within a powertrain is provided. The method includes sensing a requested power for the powertrain and sensing an excess power for the powertrain. The requested power is power that substantially meets the needs of the powertrain, and the excess power, when available, is non-zero and is not part of the requested power. The method includes sensing a triggering condition, which occurs in response to the ability to convert the excess power into heat in the transmission, and determining that an operating temperature of the transmission is below a maximum temperature.

The method also includes determining a calibrated baseline command for the pump and determining a dissipation command for the pump. The calibrated baseline command is configured to supply the fluid based upon the requested power, and the dissipation command is configured to consume the excess power with the pump, by turning the excess power into heat that is transferred to the fluid. The method then operates the pump at a combined command, which is equal to the calibrated baseline command plus the dissipation command.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
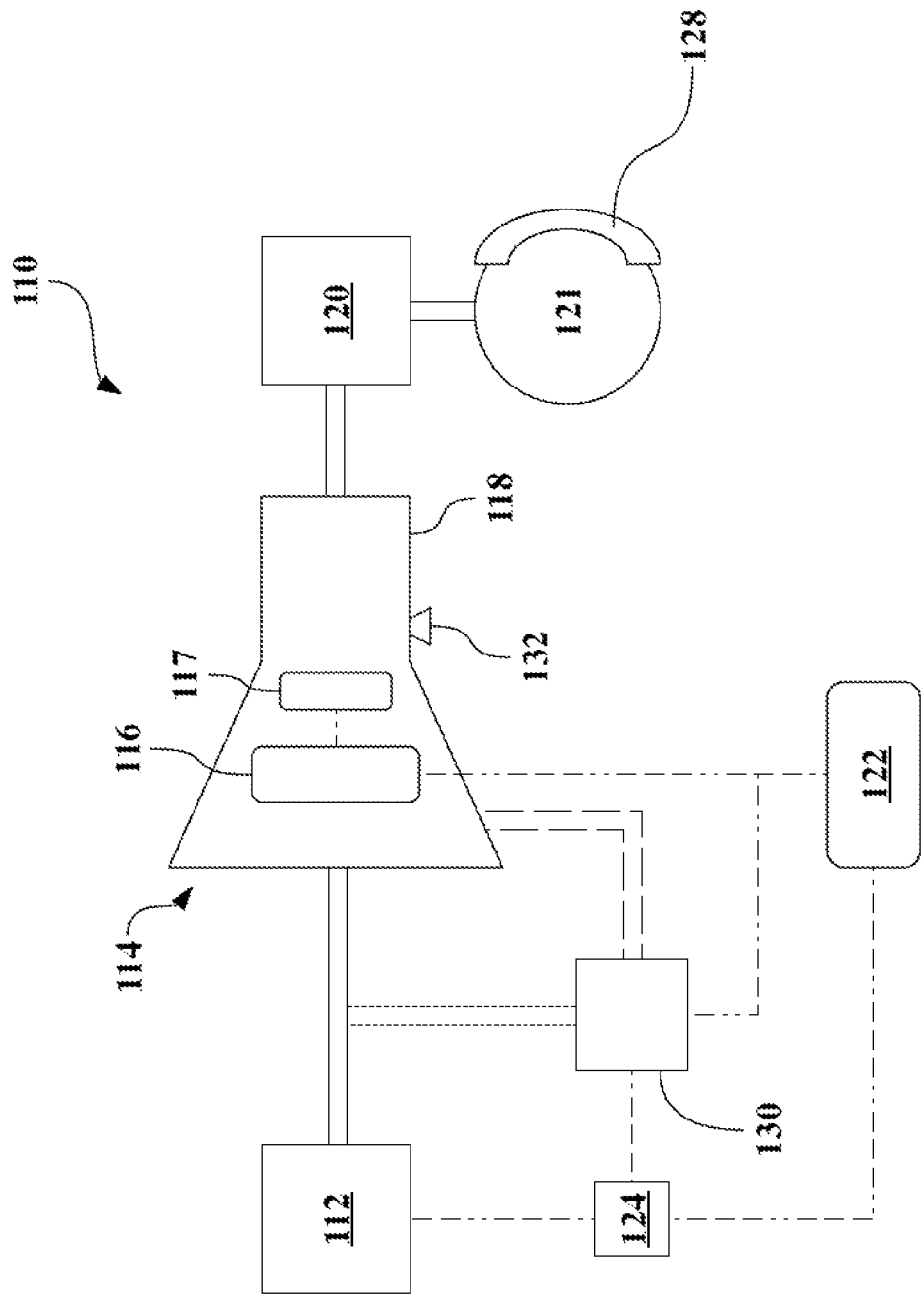
FIG. 1 is a schematic diagram of a hybrid powertrain.

Referring to the drawings, wherein like reference numbers correspond to like or similar components whenever possible throughout the several figures, there is shown in FIG. 1 a schematic diagram of a powertrain 110. As shown in FIG. 1, the powertrain 110 may generally be referred to as a hybrid powertrain or an alternative-fuel powertrain. However, removal of some of the components of the powertrain 110 yields a conventional (non-hybrid) transmission, which is also described herein. The powertrain 110 may be incorporated into a hybrid vehicle (not shown) or a conventional vehicle (not shown). Features, components, or methods shown or described in other figures may be incorporated and used with those shown in FIG. 1.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The powertrain 110 includes an internal combustion engine 112 and a transmission 114. The engine 112 is drivingly connected for mechanical powerflow with the transmission 114, which is a hybrid transmission having one or more electric machines 116. For illustrative purposes, the electric machine 116 may be referred to as a first electric machine and the powertrain 110 may include additional electric machines, such as a second electric machine 117. The electric machine 116 may be disposed between the engine 112 and the transmission 114, within a housing 118 of the transmission 114, or may be disposed adjacent the engine 112 and connected by a belt or chain to the engine 112.

The transmission 114 is operatively connected to a final drive 120 (or driveline). The final drive 120 may include a front or rear differential, or other torque-transmitting mechanism, which provides torque output to one or more wheels 121 through respective vehicular axles or half-shafts (not shown). The wheels 121 may be either front or rear wheels 121 of the vehicle on which they are employed, or they may be a drive gear of a track vehicle. Those having ordinary skill in the art will recognize that the final drive 120 may include any known configuration, including front-wheel drive (FWD), rear-wheel drive (RWD), four-wheel drive (4WD), or all-wheel drive (AWD), without altering the scope of the claimed invention.

In addition to the engine 112, the electric machine 116 may act as a traction device or prime mover for the powertrain 110. The electric machine 116, which may be referred as a motor or a motor/generator, is capable of converting kinetic energy into electric energy and also converting electric energy into kinetic energy. A battery 122 acts as an energy storage device for the powertrain 110 and may be a chemical battery, battery pack, or another energy storage device (ESD). When the powertrain 110 is a hybrid powertrain, the battery 122 may be a high-voltage battery referred to as a hybrid battery or battery pack. Furthermore, the powertrain 110 may also include a starting lighting and ignition (SLI) battery (not separately shown).

Depending upon the configuration of the powertrain 110 and the transmission 114, the additional electric machines 116 may be included and may be similarly-sized or differently-sized motor/generators. For illustrative purposes, much of the description will reference only one electric machine 116.

The electric machine 116 is in communication with the battery 122. When the electric machine 116 is converting electric energy into kinetic energy, current flows from the battery 122 to the electric machine 116, such that the battery 122 is discharging stored energy. This may be referred to as motoring, or as a motor mode. Conversely, when the electric machine 116 is converting kinetic energy into electric energy, current flows into the battery 122 from the electric machine 116, such that the battery 122 is being charged and is storing energy. This may be referred to as generating, or as a generator mode. Note, however, that internal losses of the electric machine 116, the battery 122, and the wiring of the powertrain 110 may alter the actual current flow between the battery 122 and the electric machine 116.

FIG. 1 shows a highly-schematic controller or control system 124. The control system 124 may include one or more components (not separately shown) with a storage medium and a suitable amount of programmable memory, which are capable of storing and executing one or more algorithms or methods to effect control of the powertrain 110. Each component of the control system 124 may include distributed controller architecture, such as a microprocessor-based electronic control unit (ECU). Additional modules or processors may be present within the control system 124. The control system 124 may alternatively be referred to as a Hybrid Control Processor (HCP).

Electrical current is transferable to or from the battery 122 in accordance with whether the battery 122 is being charged or discharged. The control system 124 controls power inverters and motor controllers configured to receive control commands for providing motor drive or motor regeneration functionality. When the powertrain 110 is producing negative power—such that the powertrain 110 is attempting to decelerate the vehicle—the electric machine 116 may be placed into generator mode. The electric machine 116 then converts kinetic energy of the vehicle into electrical energy, which may be stored in the battery 122, if conditions of the battery 122 allow.

One or more friction brakes 128 are configured to selectively remove power from the powertrain 110 by converting kinetic energy of the vehicle into heat. The heat generated by the friction brakes 128 is dissipated to the atmosphere. Therefore, the friction brakes 128 act as one mechanism by which power and energy leave the powertrain.

At least one transmission pump 130 pressurizes transmission fluid or transmission oil and communicates that operating fluid to the transmission housing 118. The operating fluid is circulated through the transmission housing 118 and lubricates components of the transmission 114. The operating fluid may also be used, as described herein, to alter the temperature of the transmission 114.

The powertrain 110 may further include a second or auxiliary pump (not shown). For example, and without limitation, the powertrain 110 may include the transmission pump 130 as a mechanically-driven pump and also include an electrically-driven auxiliary pump. Regardless of the type and number, the transmission pump 130 may be located within the transmission housing 118, attached to the transmission housing 118, or separate from the transmission housing 118.

A sensor 132 measures or determines an operating temperature of the fluid within the transmission 114. The sensor 132 is illustrative only and may include multiple sensors of different types disposed about multiple locations within, or external to, the transmission housing 118. For example, and without limitation, the sensor 132 may also measure or determine viscosity of the operating fluid. The transmission pump 130 may also circulate operating fluid from the transmission housing 118 through a cooling circuit or transmission radiator (not shown) which is configured to cool the operating fluid if a fluid temperature of the transmission 114 exceeds acceptable levels, as measured by the sensor 132.

Depending upon the configuration of the powertrain 110, the transmission pump 130 may be a mechanically-driven pump, which derives its power from the engine 112 through a shaft or belt (mechanical) connection. Alternatively, the transmission pump 130 may be an electrically-driven pump, which derives its power from electricity provided by the battery 122, the electric machine 116, or another electrical power source of the vehicle. Where multiple transmission pumps 130 are utilized, one transmission pump 130 may be mechanically driven (as a primary pump) by the engine 112 and another transmission pump 130 may be electrically driven (an auxiliary pump that would operate when mechanical power is not being supplied by the engine 112).

When viewed solely for its direct contribution to the efficiency of the powertrain 110, it is generally preferable for the transmission pump 130 to be operated at its ideal operating point while supplying the lowest pressure and flow needed to operate the transmission 114. The minimum operating conditions for the transmission 114 include providing sufficient operating fluid flow and pressure from the transmission pump 130 to lubricate the transmission 114 and control clutch states for the selected gear mode or for shifting between gear modes. The minimum operating conditions are met by the transmission pump 130 when it is operating at a calibrated baseline pump command.

However, the techniques and methods described herein include intentionally moving away from the ideal operating states for the transmission pump 130, and commanding operation at lesser efficiency or at increased power. Operating the transmission pump 130 at lesser efficiency or at increased power causes the transmission pump 130 to produce heat in the transmission fluid. This intentionally-heated operating fluid may then be used to improve efficiency elsewhere in the powertrain 110, such as by reducing losses in the transmission 114. When, as may be likely, the transmission pump 130 is disposed within the transmission housing 118, the heat is distributed to the transmission 114 directly from the transmission pump 130 itself, as well as through the fluid being circulated by the transmission pump 130.

Figure 2:
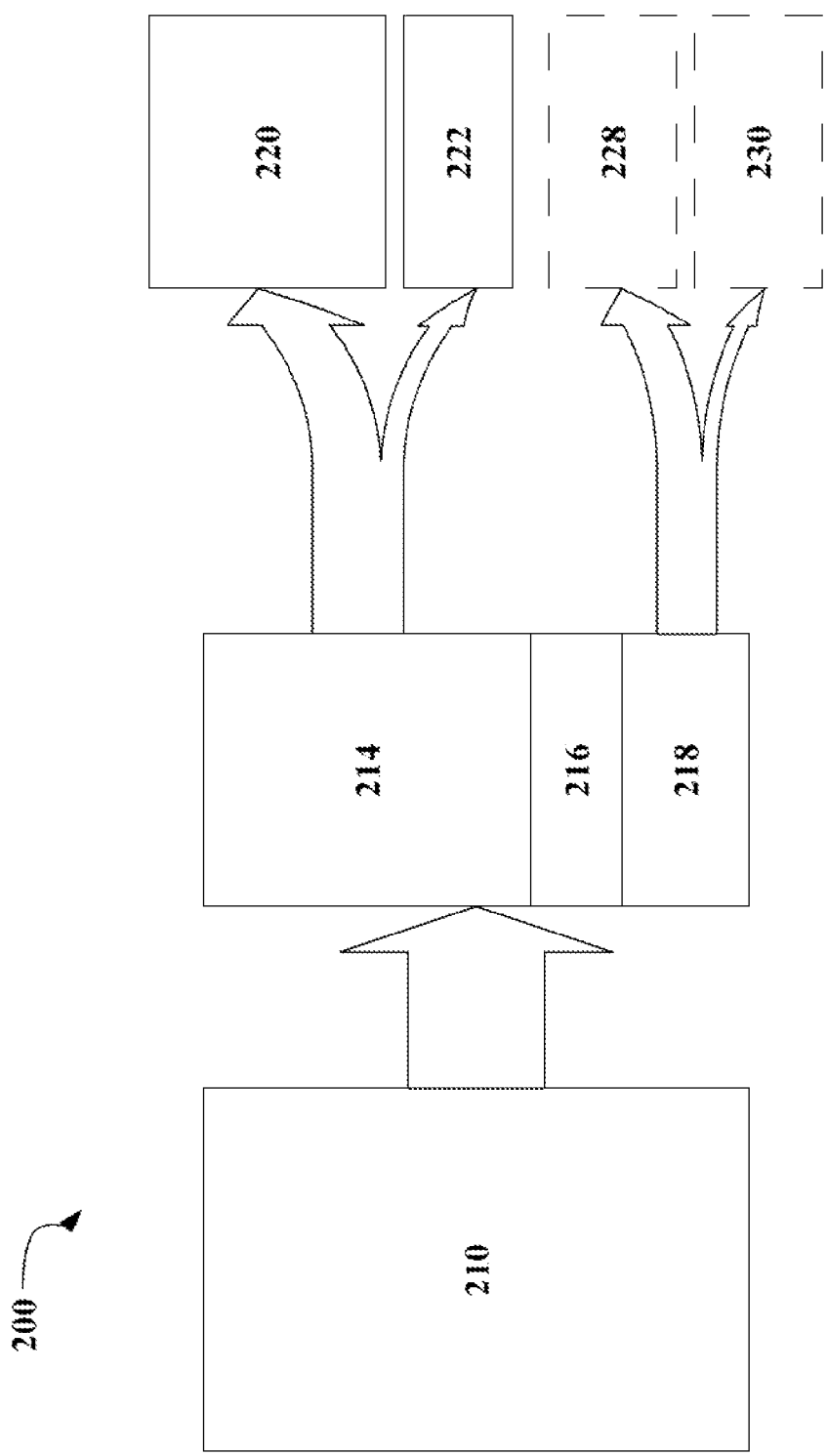
FIG. 2 is a schematic power-flow diagram illustrating energy usage in the hybrid powertrain of FIG. 1, showing diversion of an excess power away from friction brakes to a transmission pump.

Referring now to FIG. 2, and with continued reference to FIG. 1, there is shown a schematic power-flow diagram 200 that broadly illustrates use of power by the powertrain 110, or anther powertrain, within either a conventional or hybrid vehicle. The power-flow diagram 200 is highly illustrative and may not be shown to scale. The power-flow diagram 200 shows the controlled conversion of an input power 210 into multiple power or energy outputs or sinks.

The input power 210 is schematically illustrative of substantially all power entering the powertrain 110 during normal operations of the vehicle. The input power 210 includes power provided by combustion of fuel in the engine 112 and power provided by the battery 122. In conventional vehicles, combustion of fuel provides nearly all of the input power 210, including most of the stored energy used to provide power from the battery 122.

However, there are other sources of input power 210, particularly in hybrid or hybrid-electric vehicles. The input power 210 may include, without limitation: electrical power generated by the electric machine 116, such as during regenerative braking or conversion of kinetic energy of the vehicle into power; power provided by other energy storage mechanisms, such as capacitors, flywheels, or hydraulic accumulators; or power from solar energy collectors. Note that plug-in vehicles store energy in the battery 122, which may then be supplied from the battery 122 and included in the input power 210.

The input power 210 may be illustratively divided into three general categories. A requested power 214 substantially meets the needs of the powertrain 110 for operation. An inefficiency loss 216 represents the normal inefficiencies incurred by non-ideal components of the powertrain 110. The inefficiency loss 216 may be considered to generally not be recoverable (although steps may be taken to reduce inefficiencies). Depending upon the control scheme used, the inefficiency loss 216 may alternatively be included in the requested power 214, because the amount of power needed to operate the powertrain 110 may be considered as including the natural losses due to component inefficiency.

An excess power 218 is the remainder of the input power 210 which is not lost to inefficiency or used by the powertrain 110. Alternatively stated, the excess power 218 may exist during situations in which the powertrain 110 is saturated.

The requested power 214 includes all of the power that will be used by the powertrain 110 to operate the vehicle. For illustration, the powertrain 110 uses included in the requested power 214 may be simplified into two groups: traction and energy storage 220 and other vehicle uses 222. Traction and energy storage 220 includes propulsion and deceleration of the vehicle by the powertrain 110 and conversion of energy into electrical power for storage in the battery 122. The other vehicle uses 222 include, without limitation: heating, ventilation, and air conditioning (HVAC); sound and navigation components; lights and displays; the control system 124 and other computing components; and operating the transmission pump 130 at the baseline pump command (such that the traction and energy storage 220 is possible).

The requested power 214 includes power flowing to the final drive 120 during propulsion of the vehicle and power flowing from the final drive 120 during regenerative braking of the vehicle, as long as that power is used by the powertrain 110 to operate the vehicle. The excess power 218 is not included in the requested power 214, and may not always be available. Excess power 218 may be either electrical or mechanical power.

The control system 124 monitors, determines, or estimates the elements of the power-flow diagram 200 and controls distribution of the requested power 214 and the excess power 218. Note that other sources of power may be available to, and consumed by, the powertrain 110, and some sources and uses of the input power 210 may be placed in different categories for different configurations and control schemes of the powertrain 110.

The electric machine 116 may be converting power provided by the engine 112 into electrical power for storage in the battery 122, such as during warm-up periods in which the engine 112 is running at high idle. The electric machine 116 may also be converting power provided by the final drive 120 into electrical power for storage in the battery 122.

However, the battery 122 may not always be able to accept or store additional power flow as potential energy. For example, and without limitation, the battery 122 may be at a high state of charge (SOC) and unable to store generated electrical power. Furthermore, when the battery 122 is very cold, the rate of electrical power that can be accepted by the battery 122 may be limited. When the powertrain 110 is saturated with power, electrical power that is generated by the electric machine 116 but that cannot be stored by the battery 122 is part of the excess power 218. Mechanical excess power 218 may also be produced in the powertrain 110 when cold temperatures limit the ability of the electric machine 116 to generate electrical power from operation of the engine 112 or from deceleration of the vehicle. Note, however, that excess power 218 may occur when the battery 122 is not full.

Excess power 218 may also be created when the two or more electric machines 116 are electrically coupled and voltage spikes occur as power is passed from one electric machine 116 to another. These voltage spikes give rise to transient periods of available excess power 218. Furthermore, voltage spikes created by the electric machine 116—whether a first or second machine—may not be capable of capture with the friction brakes 128. Other transient events which may give rise to excess power 218 in the form of electrical power from the electric machine 116 may include, without limitation, loss of traction at the wheels 121 which triggers regeneration by the first electric machine 116.

Depending upon the source, the excess power 218 may be measured or tracked by the control system 124 in any form. When the first electric machine 116 is producing excess power 218, such as during regenerative braking when the battery 122 is full, the electrical power is the product of voltage and current. The electric machine 116 may be being controlled in a torque mode, a speed mode, a voltage mode, a current mode, or otherwise. When the engine 112 or the final drive 120 is producing the excess power 218, such as during high-idle warm-up, the mechanical power is the product of torque and velocity.

When the excess power 218 is non-zero, such that the powertrain 110 is saturated, that excess power 218 must be dissipated or removed from the powertrain 110. Otherwise, an imbalance in power will occur, which may harm the powertrain 110. As shown in FIG. 2, two power uses or power sinks may be used to dissipate the excess power 218: a friction brake sink 228 and a pump dissipation sink 230.

The friction brake sink 228 activates the friction brakes 128, which converts the excess power 218 into heat and transfers that heat to the atmosphere. This situation occurs, for example, when the vehicle is traveling downhill and the operation tries to slow or maintain vehicle speed. If there is insufficient regenerative capacity in the electric machine 116, or if the generated electricity cannot be stored in the battery 122, the friction brake sink 228 removes the excess power 218 from the powertrain 110. Furthermore, in conventional vehicles, there is no regenerative capacity available, so the friction brakes 128 may be the only conventional sink for the excess power 218.

The pump dissipation sink 230 activates the transmission pump 130 at a dissipation command, which is an additional or elevated level. The control system 124 adds the dissipation command to the calibrated baseline command for the transmission pump 130 to operate the transmission pump 130 at a combined command level. The dissipation command requires added power, when compared to the calibrated baseline command, which consumes the excess power 218.

Operating the transmission pump 130 at the increased level of the dissipation command causes the transmission pump 130 to increase the pressure, flow rate, or both pressure and flow rate, of operating fluid to the transmission 114. The increased pressure or flow rate generate heat in the operating fluid being pressurized by the transmission pump 130. Therefore, the pump dissipation sink 230 converts the excess power 218 into heat in the working fluid. If the transmission pump 130 is an electric pump, increasing to the pump dissipation command draws more electrical power from the powertrain 110. If the transmission pump 130 is a mechanical pump, increasing to the pump dissipation command draws more mechanical power from the powertrain 110.

The fluid heated by the transmission pump 130 is then transferred to the transmission housing 118 and circulates therein. This heat causes the temperature of the transmission 114 to rise. Therefore, instead of using the friction brake sink 228 to consume the excess power 218 as heat transferred to the atmosphere, the powertrain 110 may use the pump dissipation sink 230 to consume the excess power 218 as heat transferred (largely) to the transmission 114.

The pump dissipation sink 230 may be used when the operating temperature of the transmission 114—as measured by the sensor 132—is below a minimum-efficiency temperature. Efficiency of the transmission 114 may be increased by raising the operating temperature of the transmission 114 from below the minimum-efficiency temperature up to the minimum-efficiency temperature. The efficiency improvement may come from increasing the temperature of the operating fluid and thereby reducing slip losses, frictional losses, and viscosity-related drag losses. The efficiency improvement may also come from increasing the temperature of the components (planetary gearsets, clutches, electric machines, et cetera) of the transmission 114.

The excess power 218 represents power that cannot be stored or directly used by the powertrain 110. However, there may be overall efficiency gains from consuming the excess power 218 with the pump dissipation sink 230 to increase the temperature of the transmission 114 and thereby improving the operating efficiency of the transmission 114.

The minimum-efficiency temperature is configured to bring the operating temperature of the transmission 114 to a level of maximum efficiency. However, additional increases in temperature above the minimum-efficiency temperature may be possible without overheating the transmission 114 or bringing the temperature too close to a maximum temperature. Therefore, the control system 124 may also use an excess temperature, up to which the pump dissipation sink 230 may be used to heat the transmission 114 even though further efficiency gains may not be achieved through further heating of the transmission 114. When moving beyond the minimum-efficiency temperature toward the excess temperature, the pump dissipation sink 230 is assisting the friction brakes 128 to decelerate the vehicle by acting as a hydraulic brake.

Triggering conditions for activating the pump dissipation sink 230 may generally coexist with the inability to store the excess power 218. Triggering conditions denote the ability to convert the excess power 218 into heat in the transmission 114 under the current operating conditions of the powertrain 110. The presence of excess power 218 may be considered the base triggering condition. Other, more specific, situations may be used as triggering conditions.

Another, general, triggering condition is an over-voltage state for the powertrain 110, which occurs any time that the battery 122 cannot accept the available voltage due to the excess power 218. As already discussed, extreme cold temperatures may limit the ability of the battery 122 to accept current and power. If the battery 122 has an elevated state of charge, there will also be a voltage limit. For any given battery temperature and state of charge, there is a voltage limit to ensure that current and power flow to (and also from) the battery 122 do not rise to levels that can damage the cells of the battery 122. Any power flow that would push the voltage of the battery 122 above that limit is part of the excess power 218 and may be absorbed by the pump dissipation sink 230 in order to avoid possible damage to the cells of the battery 122.

In conventional, non-hybrid powertrains, the triggering condition may be any situation in which the vehicle has a negative torque request, such that the operator is requesting that the vehicle either slow or coast. If there is a negative torque request in the conventional vehicle and temperature of the transmission 114 is below the calibrated minimum temperature, the pump dissipation sink 230 may be activated such that the pump 130 draws mechanical power from the powertrain 110 and slows the vehicle. The mechanical transmission pump 130 in a conventional vehicle acts as an internal, heat-generating brake.

In some situations, the powertrain 110 may be unable to balance the power output and input, such as during shifts in which the engine 112 is required to operate at elevated revolutions and, therefore, power. During these periods of system instability, the pump dissipation sink 230 may be used to absorb power in order to balance power within the powertrain 110. However, the temperature of the transmission 114 needs to be below, at least, the maximum temperature. Otherwise, the friction brakes 128 may be used to balance power of the powertrain 110.

Some shifts or mode changes of the powertrain 110 may require the transmission 114 to pass through a neutral mode, such that the input of the engine 112 is not coupled to the final drive 120. These shifts may cause an imbalance because power from the engine 112 is not being reacted by the transmission 114. During such neutral shifts, the pump dissipation sink 230 may be activated to absorb power from the engine 112 and balance power within the powertrains 110. The power imbalance may be in the form of voltage spikes from the electric machine 116.

Much of the description herein focuses on the pump dissipation sink 230 activating the transmission pump 130 to dissipate heat to the transmission 114. However, other fluid circuits may be present in the powertrain 110. For example, the final drive 120 may include a fluid-filled differential. The differential may be used as a dissipation sink by increasing the pump command to the differential.

Figure 3:
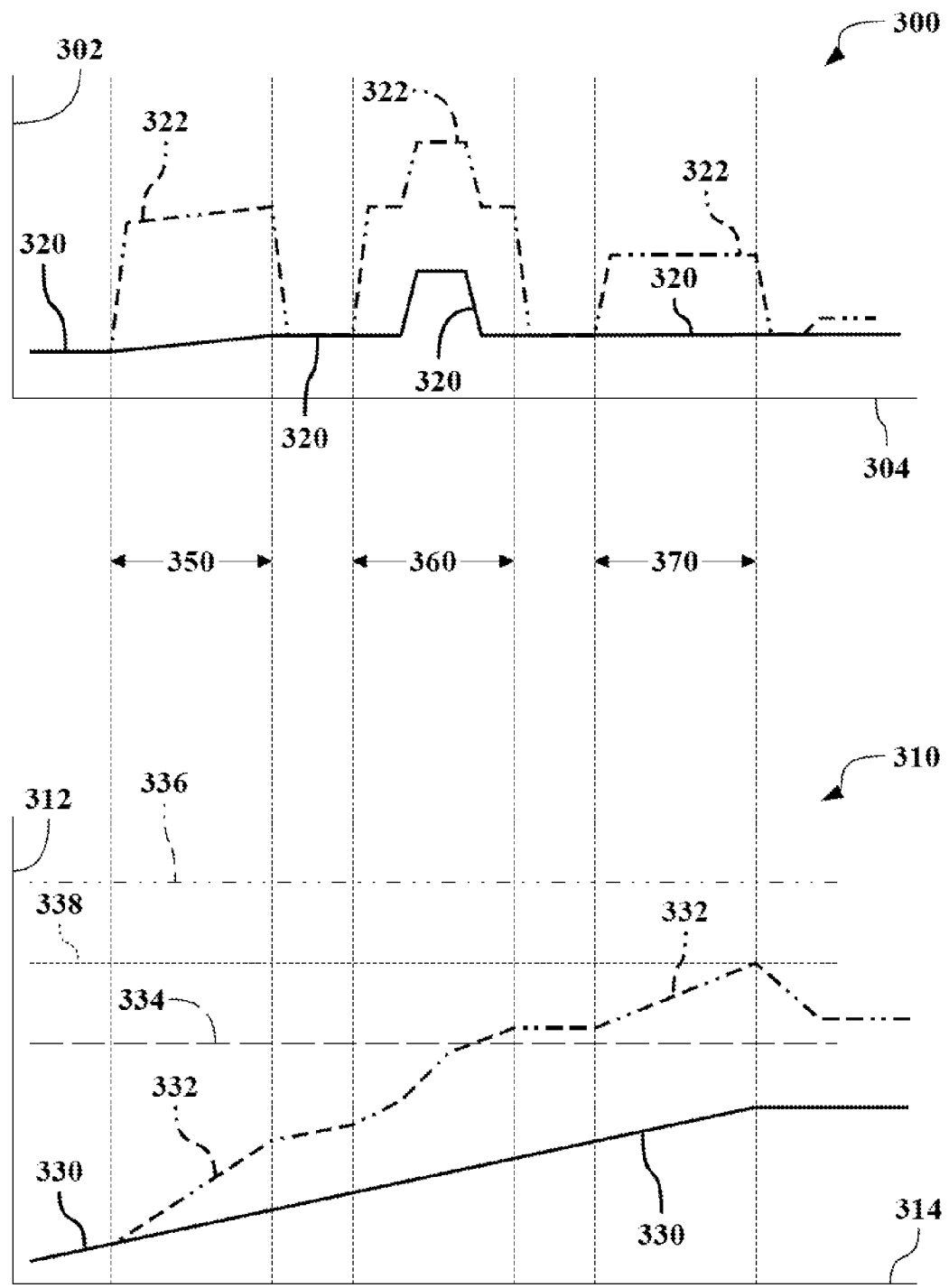
FIG. 3 is a schematic chart diagram of pump commands and temperature of fluid for the transmission pump.

Referring now to FIG. 3, and with continued reference to FIGS. 1-2, there are shown schematic charts that broadly illustrate handling of characteristics of the transmission pump 130 and the transmission 114 of the powertrain 110, or anther powertrain, within either a conventional or a hybrid vehicle. A pump command chart 300 schematically shows pressure on a y-axis 302 and time on an x-axis 304. A temperature chart 310 schematically shows the operating temperature of the transmission 114 on a y-axis 312 and time on an x-axis 314. Generally, the pump command chart 300 and the temperature chart 310 show the same time periods and scale.

As shown on the pump command chart 300, the pressure on the y-axis 302 may be either the actual line pressure issuing from the transmission pump 130 or the value of the pressure command used to control the transmission pump 130. A baseline pump command 320 shows the transmission pump 130 operating at the baseline pump command. A combined command 322 shows the transmission pump 130 operating with the added power draw of the pump dissipation command, such that power is being absorbed by the transmission pump 130. The combined command 322 is shown only where it diverges from the baseline pump command 320. Therefore, the difference between the combined command 322 and the baseline pump command 320 may be representative of the pump dissipation command for the transmission pump 130.

As shown on the temperature chart 310, a baseline operating temperature 330 shows the temperature of the transmission 114 due to operation at the calibrated baseline command 320 for the transmission pump 130. A dissipation temperature 332 shows the temperature of the transmission 114 due to operation at the combined command 322 for the transmission pump 130.

The temperature chart 310 also shows temperature levels for the transmission 114. A minimum-efficiency temperature line 334 illustrates the temperature below which the efficiency of the transmission 114 may be increased by raising the operating temperature of the transmission 114 back up to the minimum-efficiency temperature. A maximum temperature line 336 illustrates the maximum operating temperature for the transmission 114. An excess temperature line 338 illustrates the excess temperature value. When the transmission 114 is at or above the minimum-efficiency temperature, but below the excess temperature, the pump dissipation sink 230 may be used to absorb power even though the temperature increase is not needed to improve efficiency.

Three time periods or events are illustrated on the pump command chart 300 and the temperature chart 310: a first event 350, a second event 360, and a third event 370. During each of the first, second, and third events 350, 360, 370 excess power 218 is available in the powertrain 110. Therefore, during each of the first, second, and third events 350, 360, 370, the powertrain 110 may use either the friction brake sink 228 or the pump dissipation sink 230 to handle the excess power 228.

As shown in FIG. 3, before and during the first event 350 the temperature of the transmission 114 is very cold, as shown by the baseline operating temperature 330. When the temperature is very cold, the overall efficiency of the powertrain 110 may be reduced. As the first event 350 begins, and excess power 218 occurs in the powertrain 110, the control system 124 determines that increasing the temperature of the transmission 114 may be beneficial and determines to absorb the excess power 218 with the pump dissipation sink 230. Therefore, the control system 124 increases the pressure command to the transmission pump 130 and moves the control from the baseline pump command 320 to the combined command 322.

Increased pressure, flow, or both, from the transmission pump 130 causes an increase in the temperature of the transmission 114, as shown on the dissipation temperature 332 diverging from the baseline operating temperature 330. By the end of the first event 350, the pump dissipation sink 230 has increased the temperature of the transmission 114 nearer to the calibrated baseline temperature line 334. Therefore, instead of using the friction brake sink 228 to absorb the excess power 218, the powertrain 110 has absorbed the excess power 218 with the pump dissipation sink 230 and converted that power to heat which may improve efficiency in the transmission 114. As the excess power 218 available during the first event 350 disappears or is absorbed, the control system 124 returns the transmission pump 130 to the baseline pump command 320.

The second event 360 includes both the availability of excess power 218 and a transmission shift event requiring increased pressure from the transmission pump 130. Therefore, during the second event 360, the control system 124 increases the pump command from the baseline pump command 320 to the combined command 322 to absorb the excess power 218. When the baseline pump command 320 increases to allow the transmission 114 to shift, the combined command 322 also increases. However, if additional power is required to execute the shift event, the excess power 218 may decrease, such that the combined command 322 may be substantially steady during the second event 360, regardless of the shift.

By the end of the second event 360, the pump dissipation sink 230 has increased the temperature of the transmission 114 up to the minimum-efficiency temperature line 334. Therefore, there are essentially no efficiency gains to be made by further increasing the temperature of the transmission 114.

During the third event 370, excess power 218 is again available to the powertrain 110. If the control system 124 determines that it is preferential to use the pump dissipation sink 230 instead of the friction brake sink 228—for example, to minimize wear on the friction brakes 128—then the control system 124 may increase the pump command from the baseline pump command 320 to the combined command 322 to absorb some or all of the excess power 218. However, in order to maintain temperature below the excess temperature line 338, the increase over the baseline pump command 320 may not be as significant, as shown in the pump command chart 300 of FIG. 3.

Following the third event 370, the control system 124 may have mechanisms in place to cool the transmission 114 back to the minimum-efficiency temperature line 334, may allow the temperature to remain the same, or operation of the transmission pump 130 at the baseline pump command 320 may reduce the temperature of the transmission 114. Note that in the illustration shown in FIG. 3, even after the third event 370, the temperature of the transmission 114 (shown by the baseline operating temperature 330) would not have reached the minimum-efficiency temperature line 334. All of the excess power 218 available during the first, second, and third events 350, 360, 370 would have been dissipated by the friction brakes 128 and the transmission 114 would still be operating at reduced efficiency due to the cold fluid contained therein.

The first, second, and third events 350, 360, 370, shown in FIG. 3 generally occur during a start-up period, wherein the vehicle begins operating from a cold state and the transmission 114 is also cold. However, as illustrated following the third event 370, the pump dissipation sink 230 may also be used to keep the temperature of the transmission 114 above what would be its steady-state operating temperature. Therefore, the pump dissipation sink 230 and control methods for the pump 130 described herein may be used at any time during operation of the powertrain 110 in which excess power 218 is available and the temperature of the transmission 114 may be raised to benefit fuel economy or to protect components of the powertrain 110.

Figure 4:
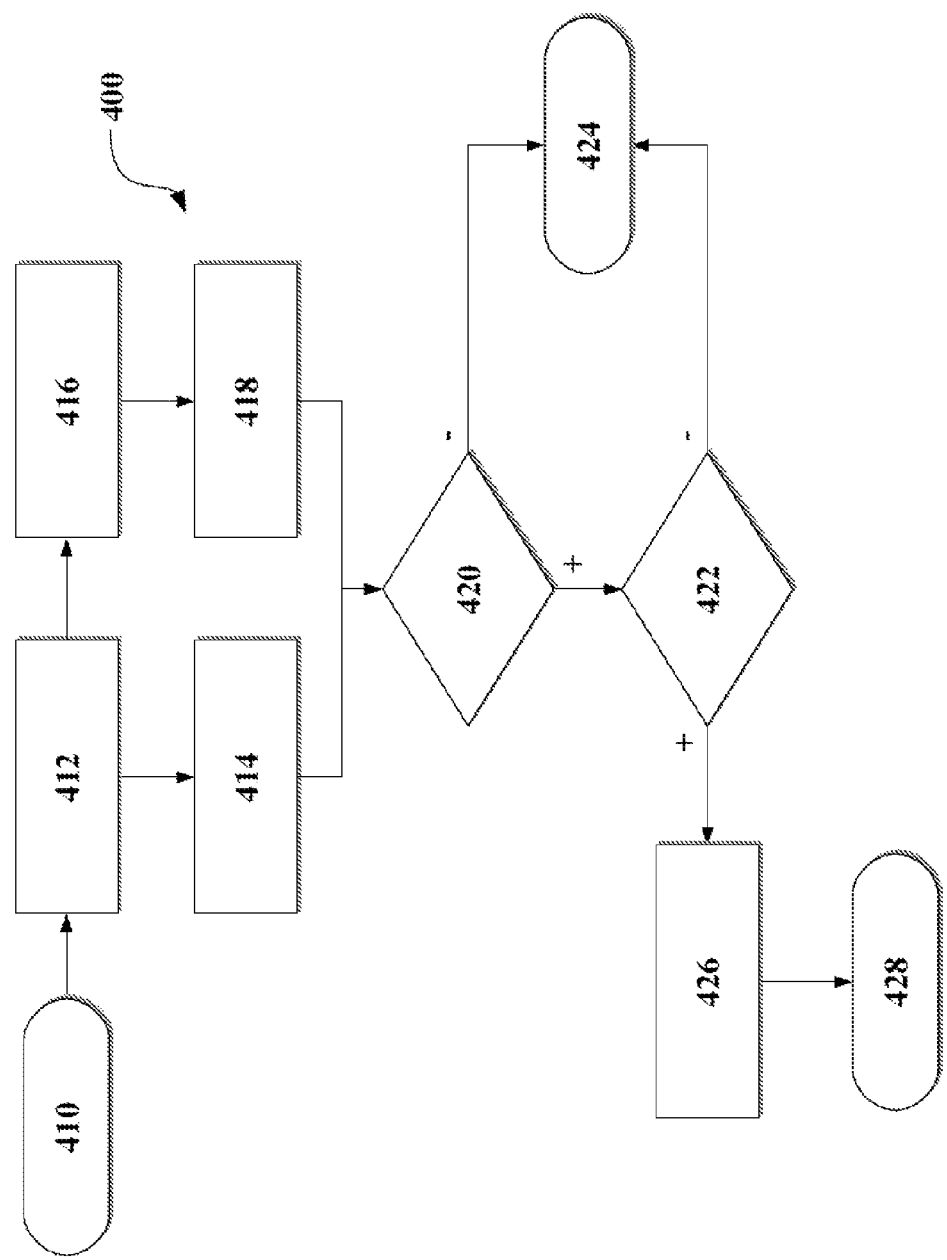
FIG. 4 is a schematic flow chart diagram of an algorithm or method for operating a powertrain, such as that shown in FIG. 1.

Referring now to FIG. 4 there is shown a schematic flow chart diagram of an algorithm or method 400 for controlling a hybrid powertrain, such as the powertrain 110 shown in FIG. 1. FIG. 4 shows only a high-level diagram of the method 400. The exact order of the steps of the algorithm or method 400 shown in FIG. 4 is not required. Steps may be reordered, steps may be omitted, and additional steps may be included. Furthermore, the method 400 may be a portion or sub-routine of another algorithm or method.

For illustrative purposes, the method 400 may be described with reference to the elements and components shown and described in relation to FIG. 1 and may be executed by the control system 124. However, other components may be used to practice the method 400 and the invention defined in the appended claims. Any of the steps may be executed by multiple components within the control system 124. The power-flow diagram 200 of FIG. 2 may be illustrative of some of the steps of the method 400, but is not limiting of the method 400.

Step 410: Start.

The method 400 may begin at a start or initialization step, during which time the method 400 is monitoring operating conditions of the vehicle and of the powertrain 110. Initiation may occur, for example, in response to the vehicle operator inserting the ignition key or in response to specific conditions being met. The method 400 may be running constantly or looping constantly whenever the vehicle is in use.

Step 412: Sense Requested Power.

The method 400 includes sensing a requested power for the powertrain 110. The requested power may be defined as the amount of power needed to substantially meet the needs of the powertrain 110 for operation. The requested power may or may not include losses occurring due to general inefficiencies, such as the non-ideal conversion of mechanical power to electrical power by the electric machine 116, in the powertrain 110.

Step 414: Determine Baseline Command.

The method 400 includes determining a calibrated baseline command for the transmission pump 130. The calibrated baseline command is configured to supply fluid based upon the requested power. The calibrated baseline command may also be referred to as a minimum pump command. The calibrated baseline command may also be the most-efficient operating state for the transmission pump 130, when viewed solely for the power used to supply minimum fluid to the transmission 114.

Step 416: Sense Excess Power.

The method 400 includes sensing an excess power for the powertrain 110. The excess power is non-zero and is not included in the requested power. The excess power represents power which will not be needed to operate the powertrain 110, such as, without limitation: excess mechanical power which cannot be converted into electrical power or used for vehicle traction; excess electrical power which cannot be stored in the battery 122 or used by vehicle electronics; or during shift events that cause quick fluctuations in power from the electric machine 116. Therefore, the excess must be taken out of the powertrain 110, by either the friction brakes 128 or by the transmission pump 130 (using the techniques described herein).

Step 418: Determine Dissipation Command.

The method 400 includes determining a dissipation command for the transmission pump 130. The dissipation command is configured to consume the excess power with the transmission pump 130. By increasing the pump command by the dissipation command, the transmission pump 130 will consume (or dissipate) additional power substantially equivalent to the excess power.

Step 420: Triggering Conditions?

In order to determine whether it is better for the powertrain 110 to absorb the excess power with the friction brakes 128 or the transmission pump 130, the method 400 includes sensing a triggering condition. The triggering conditions denote or identify the ability to convert the excess power into heat in the transmission 114 under the current operating conditions of the powertrain 110. Many situations may be used as triggering conditions, including, without limitation: cold temperatures of the battery 122; high state of charge of the battery 122; system instability; shifts through neutral; ability of the engine 112 or the wheels 121 to accept drag torque caused by absorbing the excess power; and a lack of other ways to heat the transmission 114.

Step 422: Operating Temperature Allows Pump Dissipation?

The method 400 includes determining that an operating temperature of the transmission 114 is below the minimum-efficiency temperature, allowing an improvement in efficiency of the powertrain 110 by heating the transmission 114. The method 400 may also determine whether the operating temperature of the transmission 114 is below the excess temperature, allowing an increase in temperature even though the efficiency benefits may not be as significant.

Step 424: Friction Brakes Only.

If either no triggering conditions are present or the temperature of the transmission 114 will not allow for pump dissipation, the method 400 will use only the friction brakes 128 to absorb the excess power. The friction brakes 128 are then commanded to absorb the excess power, generally by decelerating the vehicle.

Step 426: Determine Blended Command.

If triggering conditions exist and the transmission 114 can handle an increase in temperature, the method 400 determines a combined or blended command for the transmission pump 130. The blended command includes both the baseline command and the pump dissipation command.

Step 428: Blended Operation

After determining the blended command, the method 400 includes operating the pump at the combined or blended command equal to the calibrated baseline command plus the dissipation command, such that the excess power is consumed as heat by the transmission 114. Note that the triggering conditions or the temperature of the transmission 114 may partially limit the ability to use pump dissipation to absorb the excess power. Therefore, during blended operation, the method 400 may use both the transmission pump 130 and the friction brakes 128 to absorb the excess energy.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A method of controlling a first pump supplying a fluid to a transmission within a powertrain, comprising:
sensing a requested power for the powertrain, wherein the requested power substantially meets needs of the powertrain;
sensing an excess power for the powertrain, wherein the excess power is non-zero and is not included in the requested power;
sensing a triggering condition, wherein the triggering condition occurs in response to an ability to convert the excess power into heat in the transmission;

determining a calibrated baseline command for the first pump, wherein the calibrated baseline command is configured to supply the fluid based upon the requested power;

determining that an operating temperature of the transmission is below a minimum-efficiency temperature;

determining a first dissipation command for the first pump, wherein the first dissipation command is configured to consume the excess power with the first pump; and operating the first pump at a combined command equal to the calibrated baseline command plus the first dissipation command.

2. The method of claim 1, wherein the first pump is a mechanically-driven pump.

3. The method of claim 1, wherein the first pump is an electrically-driven pump.

4. The method of claim 3, wherein the powertrain further includes a second pump, and further comprising:

determining a second dissipation command for the second pump;

wherein the sum of the first dissipation command and the second dissipation command is configured to consume the excess power with the pump; and wherein the combined command is equal to the calibrated baseline command plus the first dissipation command and the second dissipation command.

5. The method of claim 1, wherein the powertrain is incorporated into a vehicle, and wherein sensing the triggering condition includes determining that the powertrain is applying negative acceleration to the vehicle.

6. The method of claim 1, wherein the powertrain includes an electric machine, and wherein sensing the triggering condition includes determining that the electric machine is generating electrical power.

7. The method of claim 6, wherein the powertrain includes a battery, and wherein sensing the triggering condition includes determining that the battery cannot accept electrical power.

8. The method of claim 1, wherein the powertrain is incorporated into a vehicle and includes a first electric machine and a second electric machine, wherein sensing the triggering condition includes determining that the powertrain is not applying negative acceleration to the vehicle, and wherein sensing the triggering condition includes determining that a voltage spike is being generated by one of the first electric machine and the second electric machine.

9. The method of claim 1, wherein the triggering condition is a period of system instability.

10. A method of controlling a pump supplying a fluid to a transmission within a powertrain, comprising:

sensing a requested power for the powertrain, wherein the requested power substantially meets needs of the powertrain;

sensing an excess power for the powertrain, wherein the excess power is non-zero and is not included in the requested power;

sensing a triggering condition, wherein the triggering condition occurs in response to an ability to convert the excess power into heat in the transmission;

determining a calibrated baseline command for the pump, wherein the calibrated baseline command is configured to supply the fluid based upon the requested power;

determining that an operating temperature of the transmission is below a maximum temperature;

determining a dissipation command for the pump, wherein the dissipation command is configured to consume the excess power with the pump; and operating the pump at a combined command equal to the calibrated baseline command plus the dissipation command.

11. The method of claim 10, wherein the powertrain includes an electric machine, and wherein sensing the triggering condition includes determining that the electric machine is generating electrical power.

12. The method of claim 11, wherein the powertrain includes a battery, and wherein sensing the triggering condition includes determining that the battery cannot accept electrical power.

13. The method of claim 12, wherein the pump is an electrically-driven pump.

14. A method of controlling a pump supplying a fluid to a transmission within a powertrain, comprising:

sensing a requested power for the powertrain, wherein the requested power substantially meets needs of the powertrain;

sensing an excess power for the powertrain, wherein the excess power is non-zero and is not included in the requested power;

determining that the powertrain is applying negative acceleration to the vehicle;

determining a calibrated baseline command for the pump, wherein the calibrated baseline command is configured to supply the fluid based upon the requested power and wherein the pump is a mechanically-driven pump;

determining that an operating temperature of the transmission is below a maximum temperature;

determining a dissipation command for the pump, wherein the dissipation command is configured to consume the excess power with the pump; and operating the pump at a combined command equal to the calibrated baseline command plus the dissipation command.

* * * * *